(12) United States Patent
Lindner et al.

(10) Patent No.: US 9,403,958 B2
(45) Date of Patent: Aug. 2, 2016

(54) PROCESS FOR PRODUCING A FOAMED MATERIAL, COMPOSITION IN THE FORM OF EMULSION USED THEREIN AND FOAMED MATERIAL OBTAINABLE THEREFROM

(75) Inventors: Stefan Lindner, Köln (DE); Wolfgang Friederichs, Köln (DE); Reinhard Strey, Dormagen (DE); Elena Khazova, Leeds (GB); Thomas Sottmann, Köln (DE); Diana Engelen, Leverkusen (DE); Agnes Dominika Chalbi, Hürth (DE)

(73) Assignee: Covestro Deutschland AG, Leverkusen (DE)

( * ) Notice: Subject to any disclaimer, the term of this patent is extended or adjusted under 35 U.S.C. 154(b) by 397 days.

(21) Appl. No.: 13/883,306

(22) PCT Filed: Nov. 4, 2011

(86) PCT No.: PCT/EP2011/069382
§ 371 (c)(1),
(2), (4) Date: Dec. 30, 2013

(87) PCT Pub. No.: WO2012/059567
PCT Pub. Date: May 10, 2012

(65) Prior Publication Data
US 2014/0107239 A1   Apr. 17, 2014

(30) Foreign Application Priority Data

Nov. 5, 2010 (DE) .......................... 10 2010 060 386

(51) Int. Cl.
*C08J 9/12* (2006.01)
*C08J 9/28* (2006.01)
*C08K 5/01* (2006.01)

(52) U.S. Cl.
CPC .. *C08J 9/122* (2013.01); *C08J 9/28* (2013.01); *C08J 2201/05* (2013.01); *C08J 2203/06* (2013.01); *C08J 2203/08* (2013.01); *C08J 2375/04* (2013.01); *C08K 5/01* (2013.01)

(58) Field of Classification Search
CPC .......... C08J 9/122; C08J 9/28; C08J 2201/05; C08J 2203/06; C08J 2203/08; C08J 2375/04; C08K 5/01
See application file for complete search history.

(56) References Cited

U.S. PATENT DOCUMENTS

| | | | |
|---|---|---|---|
| 6,303,667 B1 * | 10/2001 | Kruecke | C08J 9/122 239/337 |
| 2006/0127663 A1 | 6/2006 | Strey et al. | |
| 2012/0238655 A1 | 9/2012 | Lindner et al. | |

FOREIGN PATENT DOCUMENTS

| | | |
|---|---|---|
| DE | 10260815 A1 | 7/2004 |
| EP | 0353061 A2 | 1/1990 |
| EP | 1236762 A1 | 9/2002 |
| WO | WO-2011054868 A1 | 5/2011 |

OTHER PUBLICATIONS

International Search Report for PCT/EP2011/069382 mailed Feb. 21, 2012.

* cited by examiner

*Primary Examiner* — Irina S Zemel
(74) *Attorney, Agent, or Firm* — Drinker Biddle & Reath LLP

(57) ABSTRACT

The present invention relates to a process for producing a foamed material, wherein a composition in the form of emulsion with a matrix-forming component, a surfactant component and a near-critical or supercritical blowing agent component is submitted to a lowering of pressure. The blowing agent component further comprises a hydrophobic co-component, which is soluble in supercritical $CO_2$ at a pressure of $\geq 150$ bar, is insoluble in subcritical $CO_2$ at a pressure of $\leq 40$ bar and is insoluble in the matrix-forming component and furthermore is present in a proportion from $\geq 3$ wt % to $\leq 35$ wt % of the blowing agent component. It further relates to a composition in the form of emulsion to be used herein and a foamed material obtainable by the process according to the invention.

14 Claims, 10 Drawing Sheets

PROCESS FOR PRODUCING A FOAMED MATERIAL, COMPOSITION IN THE FORM OF EMULSION USED THEREIN AND FOAMED MATERIAL OBTAINABLE THEREFROM

RELATED APPLICATIONS

This application is a national stage application (under 35 U.S.C. §371) of PCT/EP2011/069382, filed Nov. 4, 2011, which claims benefit of German application 10 2010 060 386.4, filed Nov. 5, 2010, both of which are incorporated by reference herein.

The present invention relates to a process for producing a foamed material, wherein a composition in the form of emulsion with a matrix-forming component, a surfactant component and a near-critical or supercritical blowing agent component is submitted to a lowering of pressure. It further relates to a composition in the form of emulsion to be used therein and a foamed material obtainable by the process according to the invention.

One goal of industrial research and development is to produce nanocellular foams. One area of application of nanocellular foams is for example the thermal insulation of buildings, pipes and refrigerators. For this it is possible to take advantage of the Knudsen effect. If the pore sizes of the foams are in the region of the mean free path of the gas molecules, the thermal conductivity decreases markedly. For thermal insulation it should preferably be possible to produce the foam in large blocks. Conventional plastic foam typically contains $10^3$ to $10^6$ bubbles per $cm^3$. It would be desirable to increase the bubble density to above $10^9$ $cm^{-3}$.

Polymer foams are produced using various blowing agents. The blowing agent is used for foaming the polymers, polymer fluids or polymerizable mixtures that are to be foamed. The blowing agent can be gaseous or can be a highly volatile component, which is evaporated by the reaction heat of polymerization or by heating.

The system then becomes supersaturated and there is a tendency for gas bubbles to form. In this state the system is far from thermodynamic equilibrium, attainment of which requires a step of nucleation of the gas bubbles. Both for homogeneous and for heterogeneous nucleation, this process involves an energy barrier that must be surmounted for forming each individual bubble. The resultant foams are macrocellular.

The production of microemulsions is known. For this, using a surfactant, water and oil are converted to a macroscopically homogeneous, thermodynamically stable, nanostructured mixture. By appropriate choice of composition, pressure and temperature, the most varied structures can be produced. Thus, in oil-in-water (O/W) microemulsions the oil is in the form of small oil droplets, which are covered with a film of surfactant. The oil, as a rule a condensed long-chain hydrocarbon, can however also be replaced with short-chain hydrocarbons, such as propane, or with $CO_2$.

One possible approach to the production of nanofoams is the POSME process. POSME stands for "Principle of Supercritical Microemulsion Expansion". The starting point of this process is a mixture of water and surfactant at normal pressure, with a blowing gas above it. The concentration of surfactant in the hydrophilic phase is selected in such a way that there is formation of microemulsion droplets. By raising the pressure and temperature above the critical point of the gas ($p>p_c$; $T>T_c$), the gas is transformed to a supercritical state. If during this the gas reaches an oil-like density, through interaction with the surfactant molecules it can be incorporated into the microemulsion droplets of the aqueous phase. This leads to formation of a microemulsion with supercritical fluid as the oil component, which has a suitable structure with a droplet density of $10^{16}$-$10^{19}$ droplets per cubic centimetre and a droplet radius of approx. 5-50 nm. If this is then expanded at constant temperature to normal pressure, the microemulsion droplets swell and form a nanofoam. This can be fixed by simultaneous or previous polymerization of the monomers present in the hydrophilic phase.

By using a gas in the supercritical state, isothermal expansion does not involve passing through a two-phase region. Above the critical point, in isothermal expansion the density decreases, without a phase transition occurring. This process is of great importance for the POSME process, as the transition from a liquid-like to a gas-like density takes place continuously along a continuous isotherm. This leads to uniform swelling of the microemulsion droplets, ensuring a high level of preservation of the microstructure of the microemulsion. Below the critical temperature, in isothermal expansion there would inevitably be nucleation of the gas. In this case a two-phase region is passed through, in which gas and liquid coexist. In expansion below the critical temperature, there would thus be a sharp increase in density, possibly destroying the foam structure.

The POSME process is described in DE 102 60 815 A1. This patent application discloses foamed material and a method of production for the foamed material. Foamed material with nanosized foam bubbles is said to be produced, without having to overcome the energy barrier that usually arises in phase transformations and nucleation processes. A related goal is that of producing a foamed material controllably, which has a number density of foam bubbles between $10^{12}$ and $10^{18}$ per $cm^3$ and an average diameter of the foam bubbles between 10 nm and 10 μm. The basis for this is the dispersion of a second fluid in the form of pools in a matrix of a first fluid. In a reaction space, the first fluid is present as matrix and the second fluid is in pools. By altering the pressure and/or temperature, the second fluid is brought into a near-critical or supercritical state with a density close to that of a liquid. The second fluid is thus completely or almost completely present in the form of pools, which are uniformly distributed throughout the first fluid. On removing the pressure, the second fluid returns to a state of gas-like density, and the pools are expanded to form foam bubbles of nanometre size. No energy barrier has to be overcome, and the molecules of blowing agent do not have to diffuse to the growing bubbles.

In this case a polymerizable substance is generally proposed as the first fluid. However, only acrylamide, which polymerizes to polyacrylamide, and melamine, which polymerizes to melamine resin, are expressly mentioned. The second fluid should be selected from a group of hydrocarbon substances such as methane or ethane, and moreover alkanols, fluorochlorohydrocarbons or $CO_2$. Furthermore, an amphiphilic material is used, which should have at least one block inclined towards the first fluid and at least one block inclined towards the second fluid.

As a rule little is known about the details of nucleation processes in technical applications and they are difficult to control. Changes can lead to considerable variability of the product with respect to homogeneity and properties of the foam. Addition of particles or introduction of air bubbles are used in an attempt to initiate nucleation, but not very high number densities of bubbles can be attained in this way. In addition, the heterogeneous particles remain in the end product.

Through the use of a gaseous or a supercritical blowing agent, there may be rapid bubble growth, leading to large pore diameters and voids. Ageing processes may occur during foam production, leading to coarsening of the foam structure. Through isothermal expansion, there is swelling of the emulsion droplets that were swollen with a supercritical fluid, so that both the volume and the surface area of the emulsion droplets increase. However, as the area of the surfactant film wetting the microemulsion droplets remains constant, the surfactant film tears during expansion and regions are formed where there is energetically unfavourable contact between the at-first supercritical fluid, but then increasingly gaseous blowing agent, and water. This leads to a dramatic increase in interfacial tension.

Interfacial tension describes the force acting between two phases in contact with one another. It corresponds to the work that must be expended to alter the interface A by a specified amount. At constant volume and constant temperature, the work that must be invested for the formation of additional interface can be set equal to the change in free energy F of the system: $dF=\sigma dA$.

As the interfacial tension is always positive and the free energy dF decreases (dF<0) when the interface is reduced (dA<0), this has a natural tendency to decrease. The interfacial tension between oil and water is in the region of $\sigma=50$ $mNm^{-1}$, but through adsorption of surfactant molecules on the interface it can be lowered to up to $\sigma=10^{-4}$ $mNm^{-1}$. A tear in the surfactant film causes the interfacial tension to return to its original higher value. Through ageing processes, the system now tries to minimize its interface and therefore its energy.

One possibility for ageing is coagulation with subsequent coalescence. The process of coagulation comprises the agglomeration of individual dispersed foam bubbles, while each of these bubbles retains its identity. Coagulation is therefore the initiating step, which leads to further ageing processes. When two foam bubbles cluster together in this way, coalescence occurs: the merging of two small bubbles into a large foam bubble. In the case of coagulation and coalescence of foam bubbles, it is possible for them to minimize their interface and therefore their energy while the volume remains constant.

Another possibility for ageing, in addition to coalescence, is Ostwald ripening. Here, gas molecules diffuse from one foam bubble to another. This is a dynamic process, in which both bubbles exchange molecules with one another. However, in the case of foam bubbles with different radii R, molecular diffusion from the small to the large foam bubble is energetically favoured owing to a higher Laplace pressure $\Delta p=|p_{inside}-p_{outside}|=2\sigma/R$ inside the bubble. Through molecular diffusion, there is thus continuous growth of the larger foam bubbles at the expense of the smaller ones.

The problem to be solved by the present invention was therefore to provide a technically practicable process by which a nanocellular foam can be produced, in which the aforementioned problems of the ageing processes do not occur or no longer occur to a significant extent.

According to the invention, the problem is solved by a process for producing a foamed material, comprising the steps:
providing a composition in the form of emulsion, comprising:
A) a matrix-forming component, wherein the matrix formed is solid at room temperature,
B) a surfactant component and
C) a blowing agent component, which comprises supercritical or near-critical $CO_2$, emulsified in component A); and
bringing the $CO_2$ of the blowing agent component C) into the subcritical state by lowering the pressure;
wherein the process is characterized in that the blowing agent component C) further comprises a hydrophobic co-component D), which is soluble in supercritical $CO_2$ at a pressure of ≥150 bar, is insoluble in subcritical $CO_2$ at a pressure of ≤40 bar and is insoluble in component A) and furthermore the co-component D) is present in a proportion from ≥3 wt % to ≤35 wt % of the blowing agent component.

Figure 1:
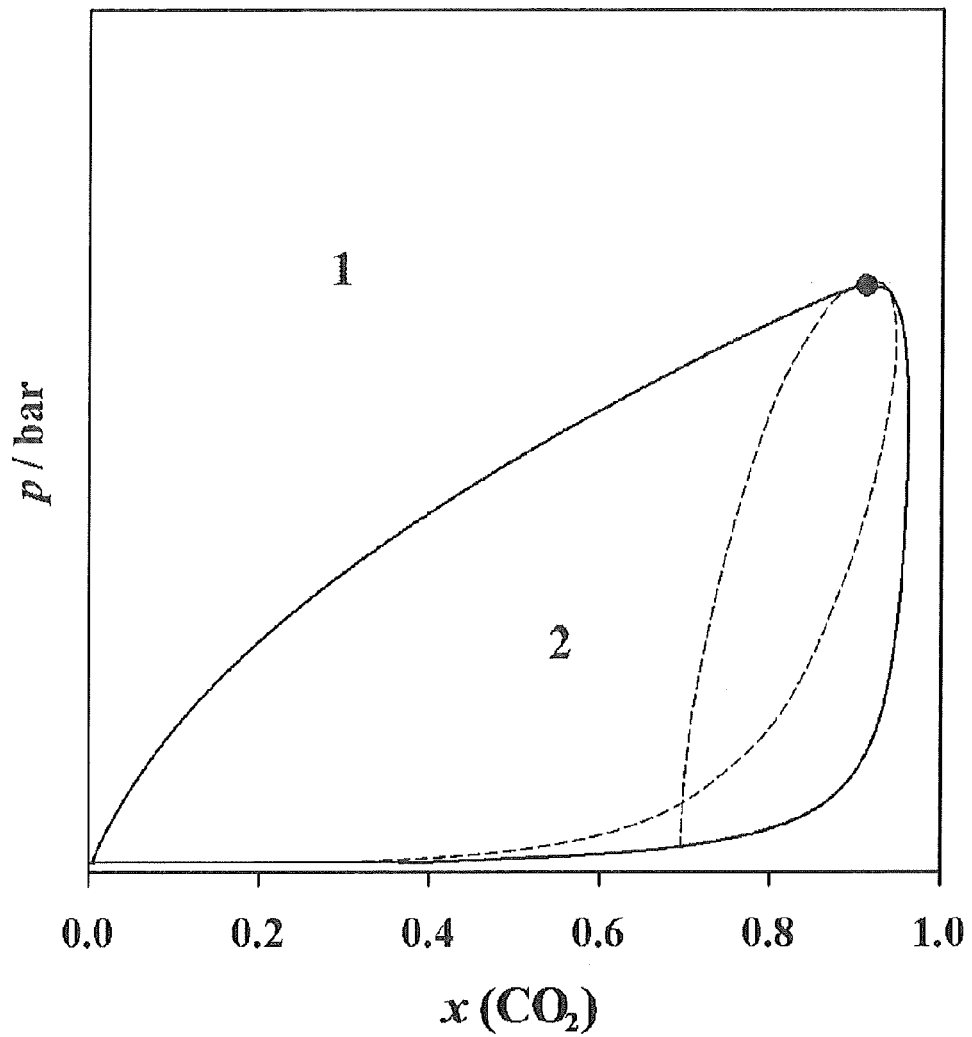
FIG. 1 shows a pressure-dependent phase diagram of a binary system.

Without being bound to a theory, it is assumed that the composition in the form of emulsion can be in the form of microemulsions. These microemulsions comprise as nonpolar component a system of blowing agent and co-component (also called "oil", without being restricted to this) at the so-called critical composition. The oil tends to accumulate in the blowing agent, owing to its hydrophobicity. The concentration then corresponds to the critical or near-critical composition, which undergoes spinodal demixing during relaxation and therefore lowers the interfacial tension in the subphase.

In the gas microemulsion described above the oil performs a stabilizing function in the foam forming during expansion, and is thus an "anti-ageing agent" (AAA). As the pressure is lowered, the microemulsion droplets of the microemulsion swell, so that their surface area increases considerably. The surfactant film is no longer able to cover the interface, so that in an unstabilized microemulsion, a new interface forms between gas and liquid.

Furthermore, owing to the decreasing density of the gas, its interactions with the surfactants become weaker and the interfacial tension increases as a result. In order to reduce the increase in free energy due to the increasing interfacial tension, the aforementioned ageing processes take place. If, however, according to the invention, the anti-ageing agent is dissolved in the gas subphase, it is precipitated on the inside wall of the microemulsion droplet during expansion. Phase separation with the blowing agent within the microemulsion droplets proceeds, controlled by the spinodal demixing and without an energy barrier.

The stabilizing effect consists here of lowering the interfacial tension, as direct contact between supercritical fluid or gas and polar phase is prevented. The anti-ageing agent has a higher density than the gas and so can better interact with the hydrophobic group of the surfactant.

The interfacial tension is in this respect very similar to that of a microemulsion. On the other hand an interface forms between gas and anti-ageing agent. However, as the system is in a near-critical state, here too the interfacial tension is low.

Expressed simply, the invention comprises the expansion of preformulated small droplets of a mixture of supercritical fluid and hydrophobic additive of critical composition in a hydrophilic matrix. The number density of the droplets can be selected freely over wide ranges by the well-known, adjustable parameters of microemulsions.

Because the mixture of critical composition undergoes spinodal demixing, a nucleation step does not occur and the size of the microemulsion droplet increases continuously. The parameter pressure, which extends spatially instantaneously, and the uniform composition of the microemulsion make possible, in combination, the production of bulk materials with spatially homogeneous distribution of bubbles.

Low pressures and small pressure differences can be applied and the bubbles develop through continuous, controllable expansion. The pressure can be lowered for a particular purpose. The parameter temperature can be freely selected over a wide range, with the proviso that its value must be above the critical temperature of the blowing agent. Through selection of the mixtures of surfactants, of the mixtures of supercritical fluids and of the anti-ageing agent, there is great flexibility in formulation of the microemulsion to be foamed.

In the first step of the process, a composition in the form of emulsion is prepared. Even the presence of solid constituents, for example fillers, is not ruled out. It is preferable for the blowing agent component C) plus co-component D) to be emulsified in the matrix component A) with the aid of the surfactants B). Preparation can for example take place in a mixing head of a high-pressure mixing unit.

In the conditions of the process according to the invention, the matrix-forming component A) should at first be liquid, so that the blowing agent can be emulsified therein. By reaction and/or cooling, a material is obtained that is solid at room temperature (defined as 20° C.) and can therefore be used for technical applications. Examples of said components A) are molten thermoplastic polymers and reaction mixtures of one or more monomers, which polymerize, thus fixing the foam obtained. This component A) can of course contain further auxiliaries and additives.

The surfactant component B) can be a single surfactant or a mixture of different surfactants. It should preferably be selected so that the formation of microemulsions in the relevant system is to be expected. This can be determined in preliminary tests.

Another component of the composition in the form of emulsion is a blowing agent component C). This comprises near-critical or supercritical carbon dioxide. Preferably $CO_2$ is the only blowing agent. The $CO_2$ can be added from outside. However, it is also possible for the carbon dioxide to be formed during the reaction to a polyurethane foam, for example by the reaction of isocyanates with water or with acids.

In the context of the present invention, near-critical conditions exist when the following condition is fulfilled: $(T_c-T)/T \leq 0.4$ (temperature in kelvin) and/or $(p_c-p)/p \leq 0.4$. Here, T is the temperature prevailing in the process, $T_c$ is the critical temperature of $CO_2$ (31° C.), p is the pressure prevailing in the process and $p_c$ is the critical pressure for $CO_2$ (73.7 bar). Preferably, near-critical conditions exist when we have: $(T_c-T)/T \leq 0.3$ and/or $(p_c-p)/p \leq 0.3$ and especially preferably $(T_c-T)/T \leq 0.2$ and/or $(p_c-p)/p \leq 0.2$.

The blowing agent can for example have a droplet size from $\geq 1$ nm to $\leq 100$ nm. The droplet size can also be $\geq 3$ nm to $\leq 30$ nm. It can be determined for example by means of dynamic light scattering or small-angle neutron scattering and is to be understood as the average value of the droplet sizes. These droplet sizes are attained in particular when the reaction mixture according to the invention is in the form of a microemulsion. A small droplet size is advantageous, because in further processing of the composition to polymer foams this produces a small cell size in the foam obtained.

Another step in the process according to the invention is bringing the $CO_2$ of the blowing agent component C) into the subcritical state by lowering the pressure. It is very preferable for this to take place by lowering the pressure above the critical temperature of the $CO_2$.

It is envisaged according to the invention that the blowing agent component C) further comprises a hydrophobic co-component D). The co-component can be a compound or a mixture of different compounds. Examples are long-chain alkanes, aromatics, polysiloxanes ("silicone oils") and long-chain organic ethers, esters and ketones.

"Hydrophobic" is defined such that the distribution coefficient of co-component D) in an n-octanol/water system log $K_{OW}$ under standard conditions is $\geq 2$, preferably $\geq 4$, and especially preferably $\geq 5$.

The co-component is different from the surfactant component. It does not act as a surfactant, although possible action as an antifoaming agent is nevertheless included according to the invention. In particular, this property can be defined such that with a non-ionic co-component D) its HLB value is $\leq 1$ and is preferably 0. The HLB value (hydrophilic-lipophilic balance) describes the hydrophilic and lipophilic fractions of mainly non-ionic surfactants. The HLB value for non-ionic surfactants can be calculated as follows: $HLB = 20 \cdot (1 - M_h/M)$, where $M_h$ is the molecular weight of the hydrophobic moiety of a molecule and M is the molecular weight of the whole molecule.

It is further envisaged that the co-component D) is soluble in supercritical $CO_2$ at a pressure of $\geq 150$ bar and is insoluble in subcritical $CO_2$ at a pressure of $\leq 40$ bar. Preferably it is soluble in supercritical $CO_2$ at a pressure of $\geq 140$ bar and is insoluble in subcritical $CO_2$ at a pressure of $\leq 60$ bar. Especially preferably it is soluble in supercritical $CO_2$ at a pressure of $\geq 120$ bar and is insoluble in subcritical $CO_2$ at a pressure of $\leq 70$ bar. "Soluble" and "insoluble" mean in this case that with the proportions by weight of co-component D) in the blowing agent component C) specified according to the invention and thus especially in $CO_2$, a single-phase or two-phase system would be obtained.

Furthermore, preferably the co-component D) is not completely soluble or insoluble in component A), so that after demixing it can be deposited on the inside of the droplets of blowing agent emulsion. "Soluble" and "insoluble" mean in this case that with the proportions by weight of co-component D) in component A) specified according to the invention, a single-phase or two-phase system would be obtained.

If the matrix-forming component A) is obtained by a reaction of a reactive mixture, the anti-ageing agent preferably does not contain any reactive groups for the reactive mixture, as this can lead to improved solubility in the reactive mixture.

Preferably the co-component D) is present in a proportion from ≥4 wt % to ≤20 wt %, especially preferably in a proportion from ≥5 wt % to ≤15 wt %, of the blowing agent component, so that we have a blowing agent component with ≥4 wt % to ≤20 wt % of D) and ≥80 wt % to ≤96 wt % of $CO_2$, especially preferably ≥85 wt % to ≤95 wt % of $CO_2$, wherein the total of the proportions by weight is ≤100 wt %.

For example, in the composition in the form of emulsion, the components A), B), C) and D) can be in the following proportions, wherein the figures always add up to ≤100 wt %:
A) ≥60 wt % to ≤95 wt %, preferably ≥65 wt % to ≤85 wt %, more preferably ≥70 wt % to ≤80 wt %;
B) ≥4 wt % to ≤30 wt %, preferably ≥6 wt % to ≤20 wt %, more preferably ≥8 wt % to ≤16 wt %;
C) ≥5 wt % to ≤30 wt %, preferably ≥8 wt % to ≤20 wt %, more preferably ≥10 wt % to ≤15 wt %; and
D) ≥0.3 wt % to ≤10 wt %, preferably ≥0.5 wt % to ≤5 wt %, more preferably ≥0.8 wt % to ≤3 wt %.

Embodiments of the process according to the invention are described below, wherein the embodiments can be freely combined with one another, unless the context clearly contradicts this.

In one embodiment of the process according to the invention, component A) comprises a compound that is reactive with polyisocyanates and a polyisocyanate. Suitable compounds reactive with polyisocyanates are in particular polyols, polyamines, polyamino alcohols, and polythiols.

Examples of polyamines are ethylenediamine, 1,2- and 1,3-diaminopropane, 1,4-diaminobutane, 1,6-diaminohexane, isophoronediamine, a mixture of isomers of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4'-diaminodicyclohexylmethane, diethylmethylbenzenediamine (DETDA), 4,4'-diamino-3,3'-dichlorodiphenylmethane (MOCA), dimethylethylenediamine, 1,4-bis(aminomethyl)cyclohexane, 4,4'-diamino-3,3'-dimethyldicyclohexylmethane and 4,4'-diamino-3,5-diethyl-3',5'-diisopropyldicyclohexylmethane. Polymeric polyamines such as polyoxyalkyleneamines are also suitable.

Examples of amino alcohols are N-aminoethylethanolamine, ethanolamine, 3-aminopropanol, neopentanolamine and diethanolamine.

Examples of polythiols are di(2-mercaptoethyl)ether, pentaerythritol tetrakis(thioglycolate), pentaerythritol tetrakis(3-mercaptopropionate) and 1,2-bis((2-mercaptoethyl)thio)-3-mercaptopropane.

The polyol is preferably selected from the group comprising polyether polyols, polyester polyols, polycarbonate polyols, polyetherester polyols, and/or polyacrylate polyols and wherein furthermore the OH number of the polyols is ≥100 mg KOH/g to ≤800 mg KOH/g, especially preferably ≥350 mg KOH/g to ≤650 mg KOH/g, and the average OH-functionality of the polyols is ≥2.

The polyols usable according to the invention can for example have a number-average molecular weight $M_n$ from ≥60 g/mol to ≤8000 g/mol, preferably from ≥90 g/mol to ≤5000 g/mol and more preferably from ≥92 g/mol to ≤1000 g/mol. In the case of a single polyol added, the OH number indicates its OH number. In the case of mixtures, the average OH number is given. This value can be determined according to DIN 53240. The average OH-functionality of the stated polyols is ≥2, for example in a range from ≥2 to ≤6, preferably from ≥2.1 to ≤4 and more preferably from ≥2.2 to ≤3.

Polyether polyols usable according to the invention are for example polytetramethylene glycol polyether, such as can be obtained by polymerization of tetrahydrofuran by cationic ring opening.

Other suitable polyether polyols are addition products of styrene oxide, ethylene oxide, propylene oxide, butylene oxides and/or epichlorohydrin on di- or polyfunctional initiator molecules.

Suitable initiator molecules are for example water, ethylene glycol, diethylene glycol, butyl diglycol, glycerol, diethylene glycol, trimethylol propane, propylene glycol, pentaerythritol, sorbitol, sucrose, ethylenediamine, toluenediamine, triethanolamine, 1,4-butanediol, 1,6-hexanediol and low-molecular, hydroxyl group-containing esters of said polyols with dicarboxylic acids.

Polyester polyols usable according to the invention include polycondensates from di- and furthermore tri-, and tetraols and di- and furthermore tri- and tetracarboxylic acids or hydroxycarboxylic acids or lactones. Instead of the free polycarboxylic acids, the corresponding polycarboxylic acid anhydrides or corresponding polycarboxylic acid esters of lower alcohols can also be used for production of the polyesters.

Examples of suitable diols are ethylene glycol, butylene glycol, diethylene glycol, triethylene glycol, polyalkylene glycols such as polyethylene glycol, furthermore 1,2-propanediol, 1,3-propanediol, butanediol(1,3), butanediol(1,4), hexanediol(1,6) and isomers, neopentyl glycol or hydroxypivalic acid neopentylglycol ester. In addition, polyols such as trimethylol propane, glycerol, erythritol, pentaerythritol, trimethylol benzene or trishydroxyethylisocyanurate can also be used.

Polycarboxylic acids that can be used are for example phthalic acid, isophthalic acid, terephthalic acid, tetrahydrophthalic acid, hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylene tetrahydrophthalic acid, dimer fatty acid, trimer fatty acid, citric acid, or trimellitic acid. The corresponding anhydrides can also be used as the source of the acid.

Provided the average functionality of the polyol to be esterified is ≥2, in addition monocarboxylic acids such as benzoic acid and hexanecarboxylic acid can also be used as well.

Hydroxycarboxylic acids that can be used as supplementary reactants in the production of a polyester polyol with terminal hydroxyl groups are for example hydroxyhexanoic acid, hydroxybutyric acid, hydroxydecanoic acid, hydroxystearic acid and the like. Suitable lactones include caprolactone, butyrolactone and homologues.

Polycarbonate polyols usable according to the invention are polycarbonates containing hydroxyl groups, for example polycarbonate diols. These can be obtained by reaction of carbonic acid derivatives, such as diphenyl carbonate, dimethyl carbonate or phosgene, with polyols, preferably diols.

Examples of said diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentanediol-1,3, dipropylene glycol, polypropylene glycols, dibutylene glycol, polybutylene glycols, bisphenol A and lactone-modified diols of the aforementioned type.

Polyether-polycarbonate diols can also be used instead of or in addition to pure polycarbonate diols.

Polyetherester polyols usable according to the invention are said compounds that contain ether groups, ester groups and OH groups. Organic dicarboxylic acids with up to 12 carbon atoms are suitable for production of the polyetherester polyols, preferably aliphatic dicarboxylic acids with ≥4 to ≤6 carbon atoms or aromatic dicarboxylic acids, which are used individually or as a mixture. As examples we may mention suberic acid, azelaic acid, decanedicarboxylic acid, maleic acid, malonic acid, phthalic acid, pimelic acid and sebacic acid and especially glutaric acid, fumaric acid, succinic acid, adipic acid, phthalic acid, terephthalic acid and isoterephthalic acid. Derivatives of these acids that can be used are for example anhydrides thereof and esters and semi-esters thereof with low-molecular, monofunctional alcohols with ≥1 to ≤4 carbon atoms.

As a further component for production of the polyetherester polyols, polyether polyols are used, which are obtained by alkoxylation of initiator molecules such as polyhydric alcohols. The initiator molecules are at least bifunctional, but optionally can also contain proportions of higher-functional, especially trifunctional initiator molecules. Polyetherester polyols can be obtained by reacting polycarboxylic acid anhydrides with diols and subsequent alkoxylation of the compounds obtained.

Initiator molecules are for example diols with primary OH groups and number-average molecular weights $M_n$ of preferably ≥18 g/mol to ≤400 g/mol or ≥62 g/mol to ≤200 g/mol such as 1,2-ethanediol, 1,3-propanediol, 1,4-butanediol, 1,5-pentenediol, 1,5-pentanediol, neopentyl glycol, 1,6-hexanediol, 1,7-heptanediol, octanediol-1,8, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, etherdiols such as diethylene glycol, triethylene glycol, tetraethylene glycol, dibutylene glycol, tributylene glycol, tetrabutylene glycol, dihexylene glycol, trihexylene glycol, tetrahexylene glycol and oligomeric mixtures of alkylene glycols, such as diethylene glycol.

In addition to the diols, polyols with number-average functionalities of >2 to ≤8, or of ≥3 to ≤4 can also be used, for example 1,1,1-trimethylol propane, triethanolamine, glycerol, sorbitan and pentaerythritol and polyethylene oxide polyols initiated with triols or tetraols with average molecular weights of preferably ≥18 g/mol to ≤400 g/mol or of ≥62 g/mol to ≤200 g/mol. Glycerol is preferred.

Polyacrylate polyols can be obtained by radical polymerization of hydroxyl group-containing, olefinically unsaturated monomers or by radical copolymerization of hydroxyl group-containing, olefinically unsaturated monomers optionally with other olefinically unsaturated monomers. Examples are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl group-containing, olefinically unsaturated monomers are in particular 2-hydroxyethyl-acrylate, 2-hydroxyethyl-methacrylate, the mixture of hydroxypropyl-acrylate isomers obtainable by addition of propylene oxide onto acrylic acid and the mixture of hydroxypropyl-methacrylate isomers obtainable by addition of propylene oxide onto methacrylic acid. Terminal hydroxyl groups can also be present in protected form. Suitable radical initiators are those from the group of azo compounds, for example azobisisobutyronitrile (AIBN), or from the group of peroxides, for example di-tert.-butyl peroxide.

Examples of suitable polyisocyanates are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, 1,4-cyclohexylene diisocyanate, 1,4-phenylene diisocyanate, 2,4- and/or 2,6-toluoylene diisocyanate (TDI), 1,5-naphthylene diisocyanate, 2,2'- and/or 2,4'- and/or 4,4'-diphenylmethanediisocyanate (MDI) or higher homologues (polymeric MDI, pMDI), 1,3- and/or 1,4-bis(2-isocyanato-prop-2-yl)-benzene (TMXDI), 1,3-bis(isocyanatomethyl)benzene (XDI), and alkyl-2,6-diisocyanato-hexanoates (lysine diisocyanates) with $C_1$ to $C_6$ alkyl groups. A mixture of MDI and pMDI is especially preferred.

As well as the aforementioned polyisocyanates, modified diisocyanates with uretdione, isocyanurate, urethane, carbodiimide, uretonimine, allophanate, biuret, amide, iminooxadiazinedione and/or oxadiazinetrione structure and unmodified polyisocyanate with more than 2 NCO groups per molecule such as for example 4-isocyanatomethyl-1,8-octanediisocyanate (nonanetriisocyanate) or triphenylmethane-4,4',4''-triisocyanate can also be used in suitable proportions.

In the reaction mixture it is possible for the number of NCO groups in the isocyanate and the number of groups reactive with isocyanates to be in a numerical ratio of ≥70:100 to ≤500:100 to one another. This characteristic can also be in a range from ≥180:100 to ≤330:100 or else from ≥90:100 to ≤140:100.

In another embodiment of the process according to the invention, component A) comprises acrylamide, epoxides and/or phenol, melamine and/or urea-formaldehyde. In this case polyacrylamide, epoxy foams, phenolic resin foams, melamine resin foams or urea foams are obtained.

In another embodiment of the process according to the invention, component A) comprises polystyrene, polyvinyl chloride, polyvinyl acetate, polyethylene terephthalate, polymethyl methacrylate, thermoplastic polyurethane (TPU), polypropylene, polyethylene and/or copolymers of styrene, butadiene, acrylonitrile, methyl methacrylate and/or vinyl acetate such as for example acrylonitrile-butadiene-styrene (ABS), styrene-acrylonitrile (SAN), styrene-butadiene-methacrylate (SBM), ethylene-vinyl acetate (EVA) and/or blends of these polymers.

In another embodiment of the process according to the invention the surfactant component B) is selected from the group comprising alkoxylated alkanols, alkoxylated alkylphenols, alkoxylated fatty acids, fatty acid esters, polyalkylene amines, alkyl sulphates, alkyl polyethers, alkyl polyglucosides, phosphatidyl inositols, fluorinated surfactants, polysiloxane groups comprising surfactants and/or bis(2-ethyl-1-hexyl)sulphosuccinate.

Alkoxylated alkanols usable as surfactant component according to the invention are for example ethers of linear or branched alkanols with ≥10 to ≤30 carbon atoms with polyalkylene glycols with ≥2 to ≤100 alkylene oxide units. For example they can be ethers of linear alkanols with ≥15 to ≤20 carbon atoms with polyalkylene glycols with ≥5 to ≤30 ethylene oxide units.

Fluorinated surfactants can be perfluorinated or partially fluorinated. Examples are partially fluorinated ethoxylated alkanols or carboxylic acids such as perfluoro-octanoic acid.

A surfactant comprising polysiloxane groups can for example be a siloxane-terminated polyalkylene oxide-polyether. These surfactants can have a linear or branched structure. Such a surfactant to be used according to the invention can for example be obtained by hydrosilylation of an unsaturated compound with a polysiloxane bearing Si—H groups. The unsaturated compound can be, among others, the reaction product of allyl alcohol with ethylene oxide or propylene oxide.

For example, the surfactant can also be obtained by reacting polyether alcohols with a polysiloxane bearing Si—Cl groups. In the polyether, all end groups can be siloxane-terminated. It is also possible for mixed end groups to be present, and thus for siloxane end groups and OH end groups or reaction-functionalized OH end groups such as methoxy groups to be present. The siloxane terminus can be a monosiloxane group $R_3Si$—O— or an oligo- or polysiloxane group $R_3Si$—O—$[R_2Si$—O$]_n$—[AO] with for example n≥1 to ≤100. In the case of branched surfactants the siloxane terminus can also be constructed according to $R_3Si$—O—RSi[AO]—O—$[R_2Si$—O$]_m$—O—$SiR_3$ with for example m≥0 to ≤10 or as comb polymer according to $R_3Si$—O—[RSi[AO]]$_n$—O—$[R_2Si$—O$]_m$—O—$SiR_3$ with m+n≥0 to ≤250. In these cases the residue R is preferably an alkyl group, especially a methyl group. The group [AO] stands for a polyalkylene oxide residue, preferably polyethylene oxide and/or polypropylene oxide. The group [AO] can also be attached to the siloxane via a linking group, for example $C_3H_6$.

In another embodiment of the process according to the invention the co-component D) is selected from the group comprising alkanes, alkenes, aromatics, esters, ethers, ketones with ≥7 to ≤20 carbon atoms, preferably ≥8 to ≤18 carbon atoms, especially preferably ≥10 to ≤16 carbon atoms, and/or linear, branched or cyclic polysiloxanes with ≥3 to ≤20 Si atoms, preferably ≥4 to ≤12 Si atoms, especially preferably ≥5 to ≤8 Si atoms.

Examples of esters are the condensation products of mono-, di-, tri- and tetracarboxylic acids with monools, diols and triols. Monools and monocarboxylic acids are preferred. Monools can for example be methanol, ethanol, propanol, butanol, pentanol, hexanol, heptanol, octanol, nonanol, decanol, undecanol, dodecanol, tridecanol, tetradecanol, pentadecanol, hexadecanol, heptadecanol or octadecanol.

Examples of diols can be ethylene glycol, 1,2- and 1,3-propanediol, 1,3- and 1,4-butanediol, 1,6-hexanediol, 1,8-octanediol, neopentyl glycol, 2-methyl-1,3-propanediol, 2,2,4-trimethylpentanediol-1,3, dipropylene glycol.

Examples of monocarboxylic acids can be formic acid, acetic acid, propionic acid, butyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid.

The polycarboxylic acids used can be for example phthalic acid, isophthalic acid, terephthalic acid, tetrahydrophthalic acid, hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid. Fatty acids are preferred.

Examples of suitable aromatics are alkylated benzene derivatives.

Examples of suitable alkenes are those with the general structural formula [R—CH=CH—R'], where R and R' are organic residues, preferably alkyl or phenyl groups.

Examples of suitable ethers are those with the general structural formula [R—O—R'], where R and R' are organic residues, preferably alkyl or phenyl groups. Ethers can also be the reaction products of diols, triols and tetraols with monools.

Examples of suitable ketones are those with the general structural formula [R—(C=O)—R'], where R and R' are organic residues, preferably alkyl or phenyl groups.

Examples of suitable polysiloxanes are those with the general structural formula [RR'Si—O]$_n$, where R and R' are organic residues, preferably methyl or phenyl groups.

Those preferred are n-decane, n-dodecane, n-tetradecane, n-hexadecane, methyl esters of fatty acids such as methyldecanoate, methyldodecanoate, methyltetradecanoate, methylhexadecanoate and cyclic siloxanes such as hexamethylcyclotrisiloxane ("D3"), octamethylcyclotetrasiloxane ("D4"), decamethylcyclopentasiloxane ("D5") and dodecamethylcyclohexasiloxane ("D6"), or linear siloxanes such as octamethyltrisiloxane ("MDM"), decamethyltetrasiloxane ("MD2M"), dodecamethylpentasiloxane ("MD3M"), tetradecamethylhexasiloxane ("MD4M") and hexadecamethylheptasiloxane ("MD5M") and branched siloxanes such as phenyl-tris(trimethylsiloxy)silane.

Preferably this co-component D) does not contain any groups reactive with isocyanates.

In another embodiment of the process according to the invention the composition in the form of emulsion is prepared at a pressure of ≥50 bar to ≤200 bar, preferably ≥70 bar to ≤120 bar, especially preferably ≥80 bar to ≤100 bar, and a temperature of ≥20° C. to ≤80° C., preferably ≥30° C. to ≤70° C.

In another embodiment of the process according to the invention, bringing the $CO_2$ of the blowing agent component C) into the subcritical state takes place in a closed mould, wherein the closed mould is not part of a mixing head of a mixing unit and is arranged so that its internal volume and/or the pressure prevailing inside it after introduction of the mixture can be altered by external action.

That the closed mould is not the mixing head of a mixing unit means in particular that this does not mean a mixing chamber or an outlet of a mixing head sealable at one end.

Preferably, while maintaining the supercritical or near-critical conditions for the blowing agent, the composition in the form of emulsion is introduced into a closed mould. The blowing agent component C) is in the supercritical or near-critical state during and after introduction. A closed mould is in particular to be understood as a mould in which an excess pressure relative to atmospheric pressure can be developed. In the simplest case the reaction mixture is introduced into the mould via a gas-tight filling hole. The closed mould prevents subcritical conditions for the blowing agent prevailing again too early.

The mould is arranged so that its internal volume and/or the pressure prevailing inside it after introducing the composition in the form of emulsion can be altered by external action. This means that not only the introduction of the composition and subsequent reaction to a foam alter the internal volume and the pressure of the mould. Rather, the mould also has other possible ways of bringing this about externally and therefore also in a controlled manner.

A counterpressure can develop in the mould when the composition is introduced, and this counterpressure can be maintained provided the mixture remains in the mould for the predetermined length of time. By means of the counterpressure, it is possible to exert an influence on the expansion of the blowing agent and therefore on cell size. It is possible for the counterpressure to be above the critical pressure for the blowing agent used. Thus, the counterpressure can be for example ≥40 bar to ≤150 bar or ≥70 bar to ≤120 bar. It is also possible for temperatures in the mould to be above the critical temperature of the blowing agent. This can be achieved with external heating. Such temperatures can also, however, be reached on account of the reaction heat of polyurethane formation without further assistance. The components can be supplied by a polyurethane high-pressure unit.

After the composition is introduced into the mould, it remains there for a predetermined time of $\geq 0$ seconds. Also during the dwell time of the composition in the mould, preferably an increased pressure is maintained. It is possible for the counterpressure to be above the critical pressure for the blowing agent or for near-critical conditions to prevail. Thus, the counterpressure can be for example $\geq 40$ bar to $\leq 150$ bar or $\geq 70$ bar to $\leq 120$ bar. It is also possible that during the dwell time in the mould, temperatures above the critical temperature of the respective blowing agent prevail or that conditions are near-critical. The preferred dwell time is $\geq 1$ seconds to $\leq 20$ minutes. The dwell time can also be $\geq 1$ minute to $\leq 12$ minutes. During the dwell time the foam obtained undergoes crosslinking, without expansion of gas bubbles in the foam causing an unintentional increase in cell size.

Then the pressure can be lowered or the volume increased in the closed mould, by external action. In the simplest case this comprises opening the mould. Depending on the dwell time and the progress of the reaction, it is also possible for cell formation in the foam to be controlled by a slow, controlled lowering of the pressure.

In another embodiment of the process according to the invention, in the composition in the form of emulsion the components have the following proportions, wherein the total of the proportions by weight is $\leq 100$ wt %:

A) $\geq 60$ wt % to $\leq 95$ wt %, preferably $\geq 65$ wt % to $\leq 85$ wt %, more preferably $\geq 70$ wt % to $\leq 80$ wt % of a reactive resin mixture of MIDI and/or pMDI with polyols that have an average hydroxyl number of $\geq 250$ mg KOH/g;

B) $\geq 4$ wt % to $\leq 30$ wt %, preferably $\geq 6$ wt % to $\leq 20$ wt %, more preferably $\geq 8$ wt % to $\leq 16$ wt % of a surfactant comprising polysiloxane groups;

C) $\geq 5$ wt % to $\leq 30$ wt %, preferably $\geq 8$ wt % to $\leq 20$ wt %, more preferably $\geq 10$ wt % to $\leq 15$ wt % of $CO_2$; and D) $\geq 0.3$ wt % to $\leq 10$ wt %, preferably $\geq 0.5$ wt % to $\leq 5$ wt %, more preferably $\geq 0.8$ wt % to $\leq 3$ wt % of dodecane.

The hydroxyl number of the polyols is determined according to DIN 53240.

Another object of the present invention is a composition in the form of emulsion, suitable for producing a foamed material, comprising:

A) a matrix-forming component, wherein the matrix formed is solid at room temperature, B) a surfactant component and C) a blowing agent component, which comprises supercritical or near-critical $CO_2$, emulsified in component A);

wherein this is characterized in that the blowing agent component C) further comprises a hydrophobic co-component D), which is soluble in supercritical $CO_2$ at a pressure of $\geq 150$ bar, is insoluble in subcritical $CO_2$ at a pressure of $\leq 40$ bar and is insoluble in component A) and furthermore co-component D) is present in a proportion from $\geq 3$ wt % to $\leq 35$ wt % of the blowing agent component.

Details regarding the individual components have already been described in connection with the process according to the invention, so that to avoid repetition reference is made thereto.

The present invention also relates to a foamed material, obtainable by a process according to the invention, comprising a solid matrix and gas bubbles distributed in the matrix, wherein this is characterized in that on the interface between matrix and gas bubble on the side facing the interior of the gas bubble, a hydrophobic co-component D) is arranged, which is soluble in supercritical $CO_2$ at a pressure of $\geq 150$ bar, is insoluble in subcritical $CO_2$ at a pressure of $\leq 40$ bar and is insoluble in component A).

Details especially regarding component D) have already been described in connection with the process according to the invention, so that to avoid repetition reference is made thereto.

Preferably the foam has an average pore diameter of $\geq 10$ nm to $\leq 10000$ nm. The pore diameter can also be $\geq 20$ nm to $\leq 1000$ nm and $\geq 40$ nm to $\leq 800$ nm. The pore diameter is preferably determined by means of electron microscopy and measuring of the pores. Alternative methods are determination by mercury intrusion (DIN 66133) and nitrogen sorption (DIN 66134).

Furthermore, the foam preferably has a pore density from $\geq 10^7$ pores/$cm^3$ to $\leq 10^{18}$ pores/$cm^3$. The pore density is determined by electron microscopy. In this, on a representative cross-sectional surface of the foam, the number of pores per unit area is determined and is extrapolated to the volume. The pore density can also be in a range from $\geq 10^9$ pores/$cm^3$ to $\leq 10^{16}$ pores/$cm^3$ and preferably $\geq 10^{12}$ pores/$cm^3$ to $\leq 10^{14}$ pores/$cm^3$.

Furthermore, the foam preferably has an apparent density from $\geq 10$ kg/$m^3$ to $\leq 300$ kg/$m^3$. The apparent density can also be in a range from $\geq 20$ kg/$m^3$ to $\leq 200$ kg/$m^3$ and preferably from $\geq 25$ kg/$m^3$ to $\leq 120$ kg/$m^3$.

Furthermore, the foam preferably has a thermal conductivity from $\geq 6$ MW/m K to $\leq 30$ MW/m K. This can be determined according to DIN 52616 and can also be in a range from $\geq 8$ MW/m K to $\leq 25$ MW/m K and preferably $\geq 10$ MW/m K to $\leq 20$ MW/m K.

In one embodiment of the foamed material according to the invention, the solid matrix comprises a polyurethane polymer. This term also includes PIR and PUR/PIR polymers. Once again, reference is made to the description of the process according to the invention.

In another embodiment of the foamed material according to the invention, the material can be obtained from a composition in the form of emulsion with components in the following proportions, wherein the total of the proportions by weight is $\leq 100$ wt %:

A) $\geq 60$ wt % to $\leq 95$ wt %, preferably $\geq 65$ wt % to $\leq 85$ wt %, more preferably $\geq 70$ wt % to $\leq 80$ wt % of a reactive resin mixture of MDI and/or pMDI with polyols that have an average hydroxyl number of $\geq 250$ mg KOH/g;

B) $\geq 4$ wt % to $\leq 30$ wt %, preferably $\geq 6$ wt % to $\leq 20$ wt %, more preferably $\geq 8$ wt % to $\leq 16$ wt % of a surfactant comprising polysiloxane groups;

C) $\geq 5$ wt % to $\leq 30$ wt %, preferably $\geq 8$ wt % to $\leq 20$ wt %, more preferably $\geq 10$ wt % to $\leq 15$ wt % of $CO_2$; and D) $\geq 0.3$ wt % to $\leq 10$ wt %, preferably $\geq 0.5$ wt % to $\leq 5$ wt %, more preferably $\geq 0.8$ wt % to $\leq 3$ wt % of dodecane.

In another embodiment of the foamed material according to the invention, the pore density is in the region of $\geq 10^7$ pores/$cm^3$.

The present invention is explained in more detail in the following figures and examples, but is not limited to these. These show:

FIG. 1 a pressure-dependent phase diagram of a binary system

Figure 2:
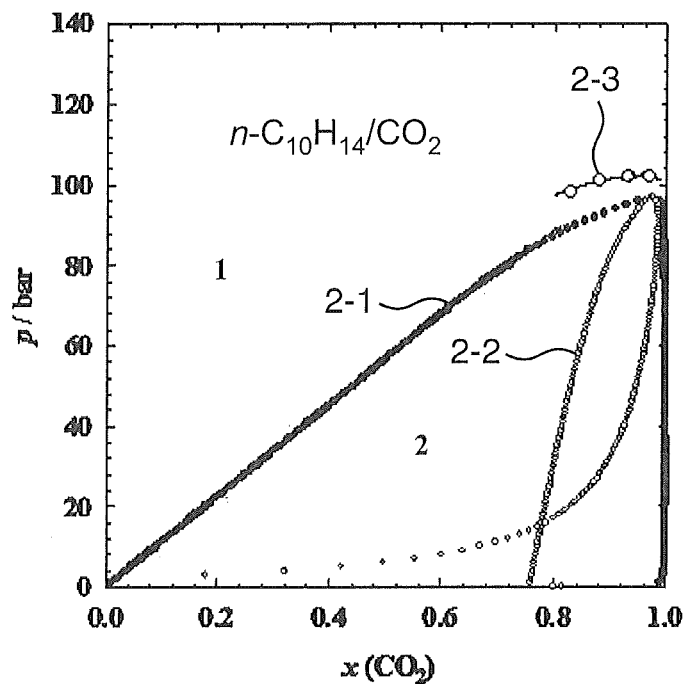
FIG. 2 shows a pressure-dependent phase diagram of the system n-decane/CO2.

FIG. 2 a pressure-dependent phase diagram of the system n-decane/$CO_2$

Figure 3:
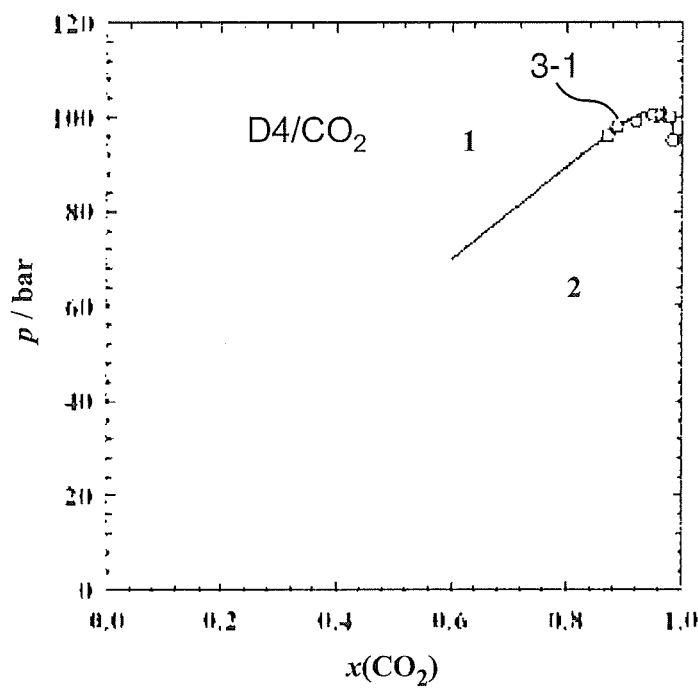
FIG. 3 shows a pressure-dependent phase diagram of the system octamethylcyclotetrasiloxane/CO2.
Figure 4:
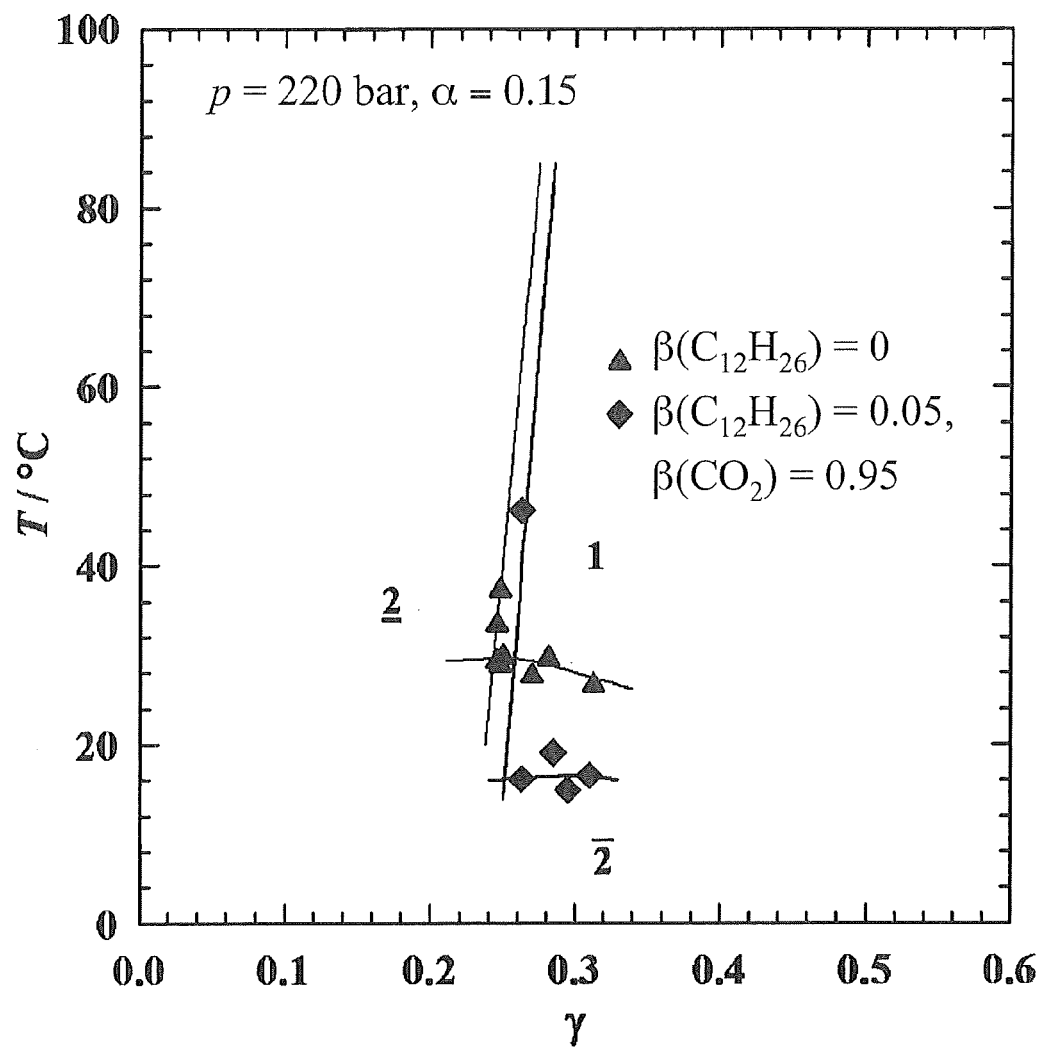
FIG. 4 shows the phase behaviour of n-dodecane-containing systems.
Figure 5:
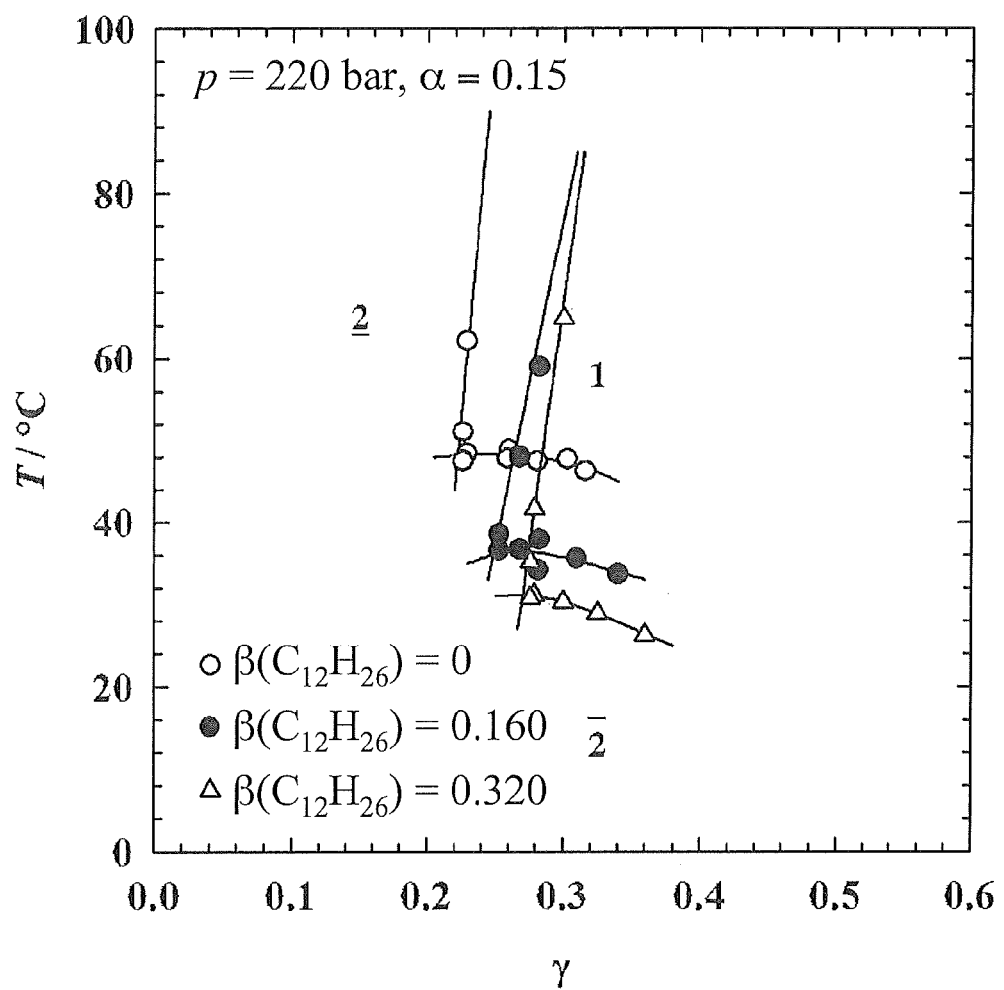
FIG. 5 shows the phase behaviour of further n-dodecane-containing systems.
Figure 6:
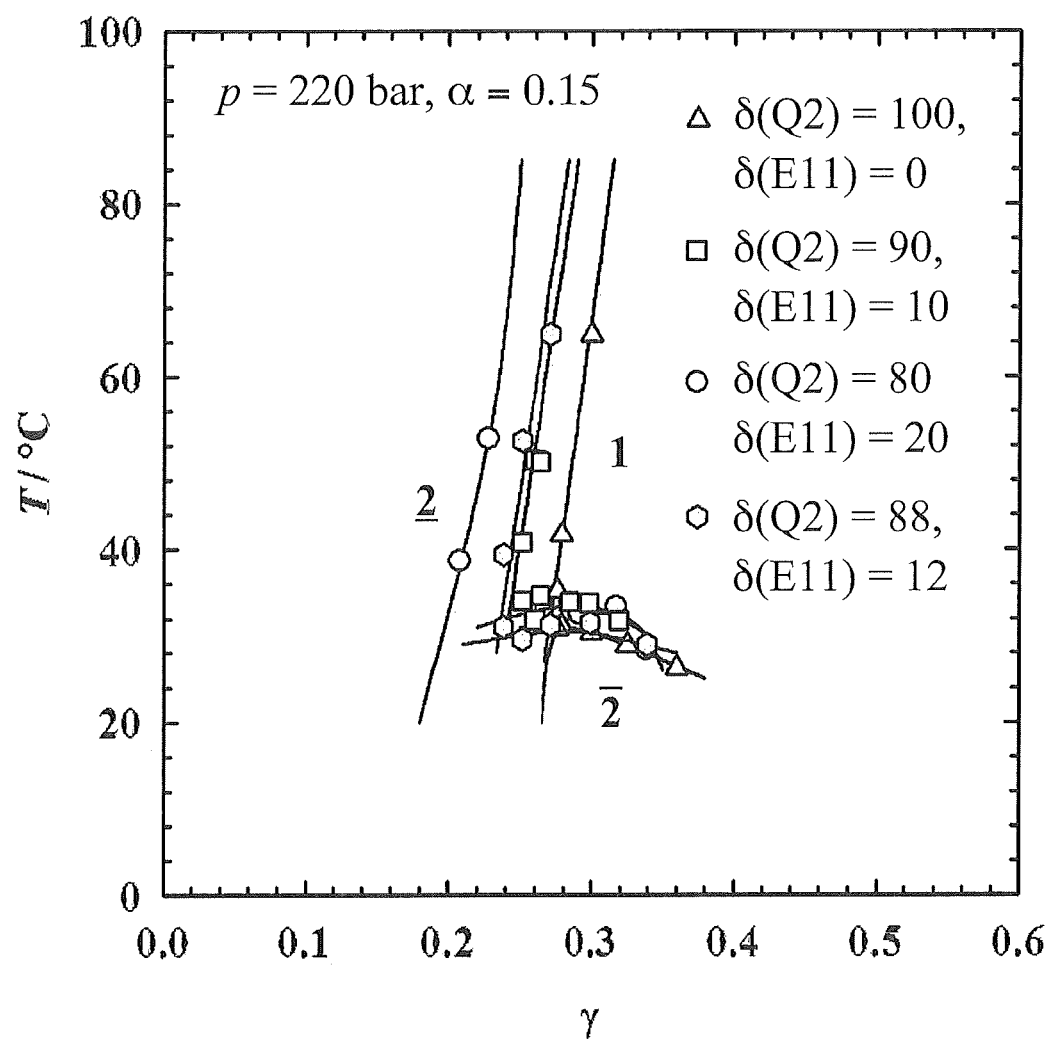
FIG. 6 shows the phase behaviour of further n-dodecane-containing systems.
Figure 7:
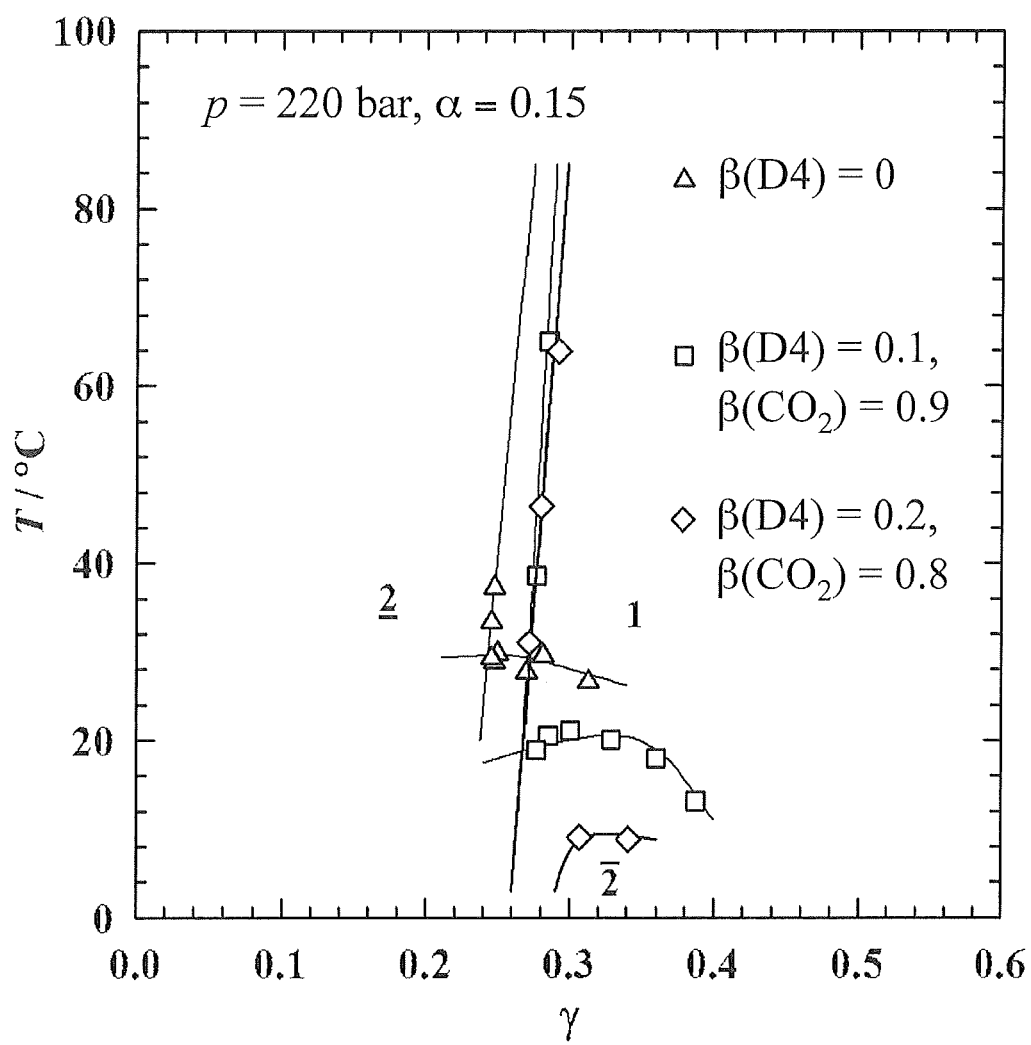
FIG. 7 shows the phase behaviour of octamethylcyclotetrasiloxane-containing systems.
Figure 8:
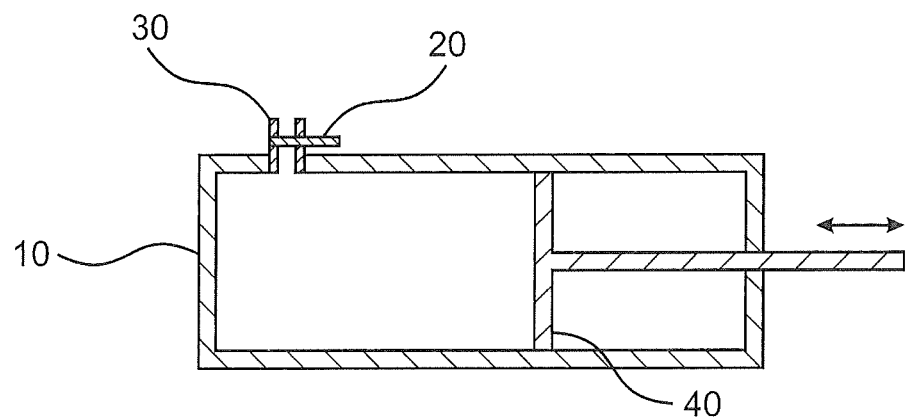
FIG. 8 shows a closed mould usable according to the invention.
Figure 9:
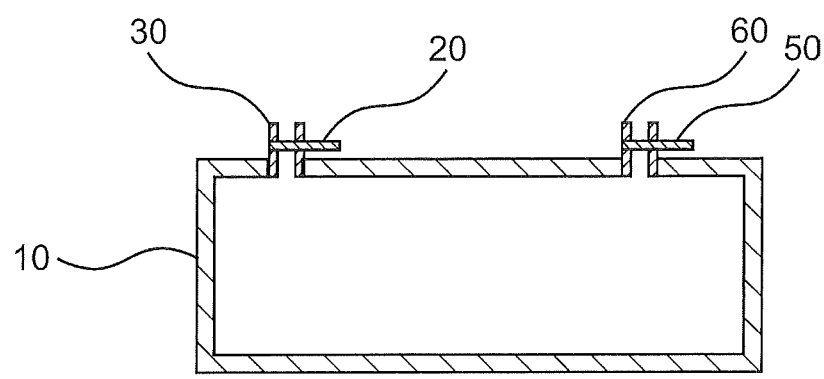
FIG. 9 shows a closed mould usable according to the invention.
Figure 10:
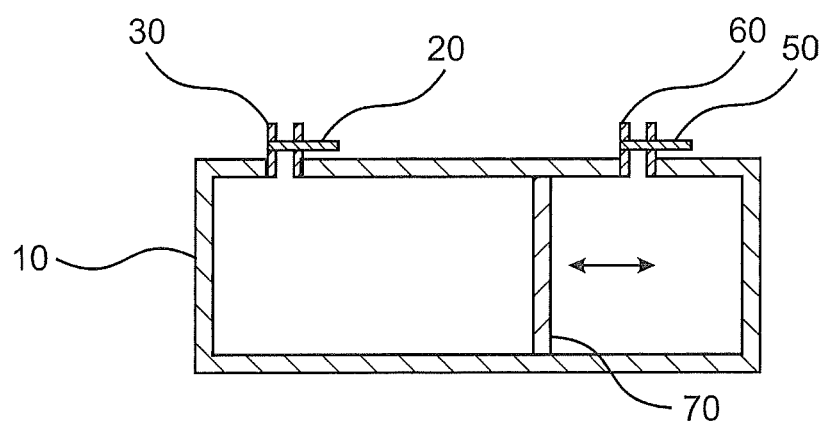
FIG. 10 shows a closed mould usable according to the invention.

FIG. 3 a pressure-dependent phase diagram of the system octamethylcyclotetrasiloxane/$CO_2$ FIG. 4 the phase behaviour of n-dodecane-containing systems FIG. 5 the phase behaviour of further n-dodecane-containing systems FIG. 6 the phase behaviour of further n-dodecane-containing systems FIG. 7 the phase behaviour of octamethylcyclotetrasiloxane-containing systems FIGS. 8 to 10 closed moulds usable according to the invention FIGS. 11 to 15 micrographs of foams obtained The names of the substances used have the following meanings:

D4: octamethylcyclotetrasiloxane

Desmophen® VP.PU 1431: bifunctional polyester polyol from the company Bayer MaterialScience AG, OH number 310 mg KOH/g Desmophen® VP.PU 20AP95: polyether polyol based on sucrose from the company Bayer MaterialScience AG, OH number 450 mg KOH/g Desmodur® 44V20L: mixture of diphenylmethane-4,4'-diisocyanate (MDI) with isomers and higher-functional homologues TCPP: tris(2-chloroisopropyl)phosphate Q2-5211®: siloxylated polyethylene oxide polyether from the company Dow Corning, 3-(polyoxyethylene)propyl-heptamethyltrisiloxane, end groups: OH and heptamethyl-trisiloxane, 32% siloxane units, 68% ethylene oxide units; HLB value of the EO moiety: 11.5

Emuldac® AS-11: $C_{16}$-$C_{18}$ alcohol-polyethylene glycol ether (11 EO)

Emuldac® AS-25: $C_{16}$-$C_{18}$ alcohol-polyethylene glycol ether (25 EO)

Zonyl® FSN-100: ethoxylated non-ionic fluoro surfactant, CAS No. 65545-80-4

DABCO: 1,4-diazabicyclo[2.2.2]octane

DBTL: dibutyltin dilaurate

Silwet® L-7607: siloxane polyalkylene oxide copolymer from the company Momentive FIG. 1 shows schematically a pressure-dependent phase diagram of a binary system, wherein $CO_2$ is one of the two components of the system. The x-axis denotes the relative proportion of $CO_2$ in the system. At high pressures the two components are fully miscible with one another, and there is thus a single-phase region here. This is marked as "1".

By lowering the pressure, phase separation is induced. The two-phase region "2" is enclosed by the so-called binodal, which is drawn as a solid line. Within this region, however, there is another region, which is enclosed by the spinodal, drawn as a dashed line.

These two regions differ in their stability. On passing, as a result of expansion at constant composition, from the single-phase into the two-phase region that is below the binodal, phase separation occurs by nucleation. This region is also designated as metastable, because for nucleation to occur, an energy barrier must be overcome.

If, however, a sample passes as a result of expansion from the single-phase region directly into the unstable region below the spinodal, the mixture must have the critical (or almost critical) composition. The critical point is in this case the maximum of the binodal curve. Spontaneous demixing occurs here without exceeding an energy barrier and therefore without the occurrence of a nucleation step. The demixing is induced by local sinusoidal fluctuations of the concentration. So-called spinodal demixing has a characteristic phase morphology.

FIG. 2 shows the binary phase behaviour as a function of pressure for the system n-decane/$CO_2$ as an example of a long-chain alkane as co-component D). Single-phase and two-phase regions are marked with "1" and "2". The data points 2-1 symbolize the calculated binodal of the system. Correspondingly, data points 2-2 symbolize the calculated spinodal. Data points 2-3 designate the experimentally determined binodal. The critical point of the system was determined as $x(CO_2)=0.94$ and p=102 bar.

Comparable experiments were also carried out with the higher homologues n-dodecane, n-tetradecane and n-hexadecane. In this case an increase in the maximum of the binodal was observed with increasing chain length of the alkane.

FIG. 3 shows the binary phase behaviour as a function of the pressure for the system octamethylcyclotetrasiloxane (D4)/$CO_2$ as an example of a siloxane as co-component D). Single-phase and two-phase regions are marked with "1" and "2". The data points 3-1 designate the experimentally determined binodal. The critical point of the system was determined as $x(CO_2)=0.96$ and p=101 bar.

In the following examples and the associated figures, the value α shows the relative proportion by weight of the blowing agent, i.e. the nonpolar phase, in the polyol/blowing agent mixture. The value Ψ denotes the mass fractions of the individual components in the polar phase. The value β describes the composition within the nonpolar phase, i.e. the blowing agent components. The value γ denotes the relative proportion by weight of the surfactant component in the total composition.

Similarly, the value δ refers to the composition of the surfactant component. In these figures the reference symbol 1 denotes a single-phase region in which microemulsions occur, 2 denotes a two-phase region, in which the surfactant is dissolved in the polar phase, and $\overline{2}$ denotes a two-phase region in which the surfactant is dissolved in the nonpolar phase.

The individual examples relate in each case to particular polyol/blowing agent/surfactant systems. With the proportion α constant in each case, the composition of the nonpolar phase was altered by adding a co-component D). The temperature of the system was noted and connecting lines were interpolated between the measuring points, in order to determine the boundaries between the single-, two- and three-phase regions. In this way a diagram was obtained that is comparable to a Kahlweit-Fisch diagram (M. Kahlweit, R. Strey, Angewandte Chemie ("applied chemistry") International Edition, Vol. 28(8), p. 654 (1985)). The point of intersection of the connecting lines is of particular interest for characterization of the system. With known position of the point of intersection in the coordinate system of γ and T, at a slightly larger proportion of surfactant γ a microemulsion can be expected.

FIG. 4 shows the phase behaviour of systems with Desmophen® VP.PU 1431, glycerol, TCPP, Q2-5211®, n-dodecane and supercritical $CO_2$. The polar phase had the following composition: Ψ(1431)=0.814; Ψ(glycerol)=0.136; Ψ(TCPP)=0.050. Supercritical $CO_2$ without further co-component was used once (triangles), and with 5 wt % (relative to the blowing agent component) of n-dodecane as co-component (rectangles).

FIG. 5 shows the phase behaviour of further systems with Desmophen® VP.PU 1431, glycerol, TCPP, Q2-5211®, n-dodecane and supercritical $CO_2$. The polar phase had the following composition: Ψ(1431)=0.728; Ψ(glycerol)=0.136; Ψ(TCPP)=0.136. Supercritical $CO_2$ was used without further co-component (circles), with 16 wt % (relative to the blowing agent component) of n-dodecane as co-component (filled circles) and with 32 wt % (relative to the blowing agent component) of n-dodecane as co-component (triangles).

FIG. 6 shows the phase behaviour of further systems with Desmophen® VP.PU 1431, glycerol, TCPP, Q2-5211®, Emuldac® AS-11, n-dodecane and supercritical $CO_2$. The polar phase had the following composition: $\Psi(1431)=0.728$; $\Psi(glycerol)=0.136$; $\Psi(TCPP)=0.136$. In these tests the surfactant component was modified by adding Emuldac® AS-11. The following surfactant mixtures were used (wt % relative to the surfactant component): Q2-5211®:Emuldac® AS-11=100:0 (triangles), 90:10 (rectangles), 80:20 (circles) and 88:12 (hexagons).

FIG. 7 shows the phase behaviour of systems with Desmophen® VP.PU 1431, glycerol, TCPP, Q2-5211®, octamethylcyclotetrasiloxane (D4) and supercritical $CO_2$. The polar phase had the following composition: $\Psi(VP.PU1431)=0.814$; $\Psi(glycerol)=0.136$; $\Psi(TCPP)=0.050$. Supercritical $CO_2$ was used without further co-component (triangles), with 10 wt % (relative to the blowing agent component) of D4 as co-component (rectangles) and with 20 wt % (relative to the blowing agent component) of D4 as co-component (turned rectangles).

FIG. 8 shows a closed mould that can be used according to the invention. The mould has an outer housing 10 with a filling hole 30, closable by a shut-off device 20 (shown schematically). The mixture comprising the required reaction components is introduced into the mould. A seal 40 configured like a piston can be moved within the housing 10. In this way a volume delimited by the seal 40 for receiving the reaction mixture is created within the mould. The position of the seal 40 within the housing can be reached by displacement by means of the rod-shaped extension of the seal 40 projecting from the housing 10, and thus by mechanical pressure.

FIG. 9 shows another closed mould that can be used according to the invention. This mould also has an outer housing 10 with a filling hole 30, closable by a shut-off device 20 (shown schematically). The mixture comprising the required reaction components is introduced into the mould. External influence is exerted on the pressure in the mould by applying a gas pressure via another valve device 60. This is shown schematically and can be closed if necessary by means of shut-off device 50. It is also conceivable in the context of the present invention for the filling hole 30 and the valve device 60 to be combined with one another. For example, a mixing head mounted on the filling hole 30 can then also at the same time apply gas pressure to the mould.

FIG. 10 shows another closed mould that can be used according to the invention. The mould also has an outer housing 10 with a filling hole 30 closable by a shut-off device 20 (shown schematically). The mixture comprising the required reaction components is introduced into the mould. Inside the housing 10 there is a freely movable or also free-floating seal 70. In this way a volume delimited by the seal 40 for receiving the reaction mixture (reaction volume) is created within the mould. On the other side of seal 70, another volume 10 is obtained within the mould, which is to be designated here as working volume.

In contrast to the mould shown in FIG. 8, the position of the seal is not altered by mechanical pressure, but by gas pressure. The pressure is applied in the working volume via a valve device 60, which can if required be closed with the shut-off device 50. In this way the working volume can be increased or decreased relative to the reaction volume. This is accompanied by an increase or decrease of the pressure in the reaction volume. Of course, not only gases can be introduced into the working volume by means of valve device 60, but also other fluids, for example hydraulic fluids.

Foaming Test 1:

A system of water and NaCl as polar phase and $CO_2$, n-decane, Zonyl® FSN-100 and Emuldac® AS-25 as nonpolar phase was relaxed from an initial pressure of 90 bar to 60 bar. The other parameters of the system were: T=50° C., $\gamma(a)=0.25$, $w(b)=0.205$, $\beta(n\text{-decane})=0.15$, $\epsilon=0.01$ and $\delta(FSN\text{-}100)=0.60$.

Within approx. 20 ms, the system began to turn cloudy. This observation is consistent with spinodal demixing of the oil component. The theoretically calculated spinodal demixing rate of n-decane and water is 30 ms. It was also observed that the structure of the single-phase microemulsion was maintained for quite a long time during expansion. This is implied on the one hand by the rapid onset of clouding with simultaneous retention of transparency and on the other hand by the increase in volume of the microemulsion.

Foaming Test 2:

A system of Desmophen® VP.PU 1431, Desmophen® VP.PU 20AP95 and glycerol as polar phase and $CO_2$, n-decane and Q2-5211® as nonpolar phase was relaxed from an initial pressure of 110 bar to 91 bar. The other parameters of the system were: $\Psi(VP.PU\ 1431)=0342$; $\Psi(glycerol)=0.158$; $\Psi(VP.PU20AP95)=0.100$, T=50° C., $\gamma(a)=0.30$, $w(b)=0.15$ and $\beta(n\text{-decane})=0.15$.

Once again, initial turbidity of the system was observed, and furthermore an increase in volume of the microemulsion within the measuring cell totaling $\Delta V(\text{microemulsion})=+14\%$ was determined The only component whose volume is so strongly dependent on the pressure is the $CO_2$. The structure of the selected sample for the foaming tests corresponded to that of a microemulsion with gas-filled microemulsion droplets in water. Owing to expansion, the supercritical $CO_2$ changed from a liquid-like to a gas-like density and increased in volume. Theoretical calculation shows a volume increase for pure $CO_2$ of $\Delta V(CO_2)=+16\%$, which agrees with the observed volume increase within the limits of error.

Polyurethane Foams

A microemulsion obtainable according to the teaching according to the invention was converted to a polyurethane foam. In this case $CO_2$ was added to a mixture of polyols and catalysts (DBTDL and DABCO) and surfactant at 34° C. and a pressure of 170 bar. Without being restricted to a theory, it is assumed that in this case a microemulsion of $scCO_2$ droplets formed in the polyol phase. The polyisocyanate was added to this emulsion in a high-pressure mixing head. Then the reaction mixture was introduced into a mould (according to FIG. 10) with a specified counterpressure, shown in the following table. Therefore, in the examples according to the invention, supercritical conditions still prevailed in the mould with respect to the $CO_2$. It was not until after introduction into the mould preheated to 35° C. and a certain dwell time that the pressure was lowered to normal pressure. The weights shown in these examples are parts by weight. The total shot weight was in each case 120 g.

| Components | Example 3 | Example 4 | Example 5 | Example 6 | Comparative example 7 |
|---|---|---|---|---|---|
| Desmophen ® VP.PU 1431 | 95.00 | 95.00 | 95.00 | 95.00 | 95.00 |
| Glycerin | 15.00 | 15.00 | 15.00 | 15.00 | 15.00 |
| Silwet L-7607 | 45.00 | 45.00 | 45.00 | 45.00 | 45.00 |
| DABCO | 0.10 | 0.10 | 0.10 | 0.10 | 0.28 |
| DBTDL | 0.07 | 0.07 | 0.07 | 0.07 | 0.07 |
| Phenyl-tris(trimethylsiloxy)silane | 1.45 | 1.45 | 1.45 | 1.45 | 1.45 |
| $CO_2$ | 28.90 | 35.00 | 40.50 | 28.90 | 40.50 |
| Desmodur ® 44V20L | 108.45 | 108.44 | 108.45 | 108.45 | 108.45 |

-continued

| Components | Example 3 | Example 4 | Example 5 | Example 6 | Comparative example 7 |
|---|---|---|---|---|---|
| Characteristic number | 80.00 | 80.00 | 80.00 | 80.00 | 80.00 |
| Isocyanate temperature [° C.] | 35 | 35 | 33 | 34 | 34 |
| Polyol temperature [° C.] | 33 | 34 | 35 | 35 | 35 |
| Mixing time [s] | 2 | 2 | 2 | 2 | 2 |
| Counterpressure [bar] | 100 | 100 | 100 | 80 | 30 |
| Dwell time | 90 min | 90 min | 90 min | 36 sec | 90 min |
| Demoulding time [min] | 90 | 90 | 90 | 30 | 90 |

In comparative example 7, it was introduced at a counterpressure of 30 bar. Therefore conditions were not supercritical for the $CO_2$. In contrast to the examples according to the invention, the specimen was inhomogeneous and had streaks.

Figure 11:
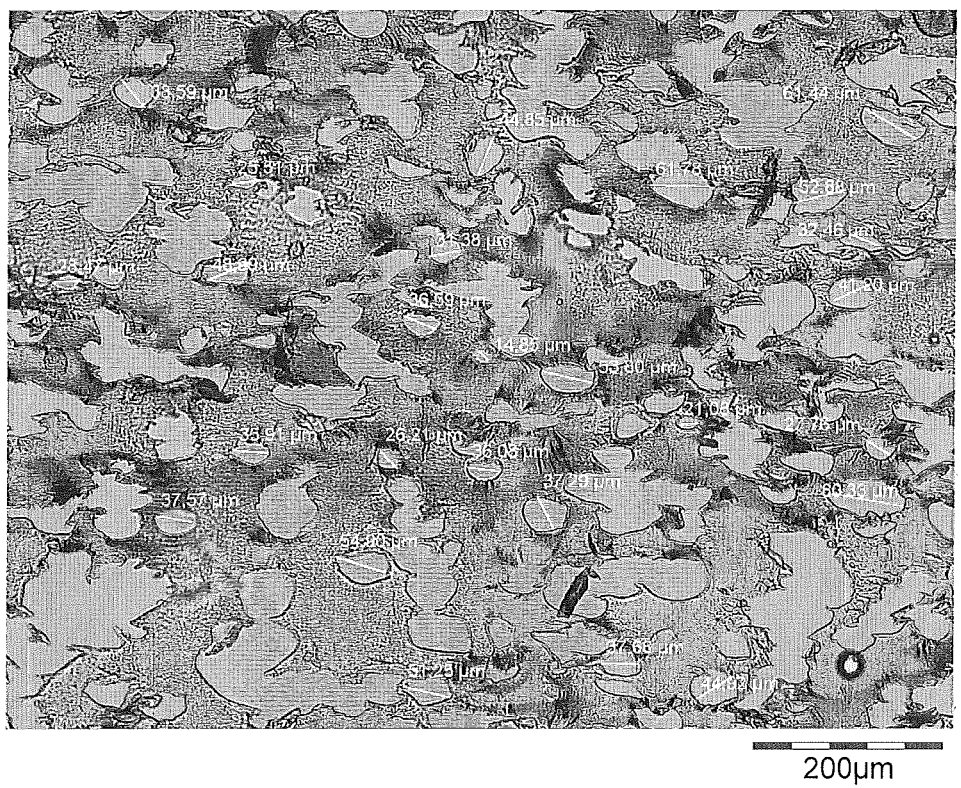
FIG. 11 shows a micrograph of foamed material of Example 5.
Figure 12:
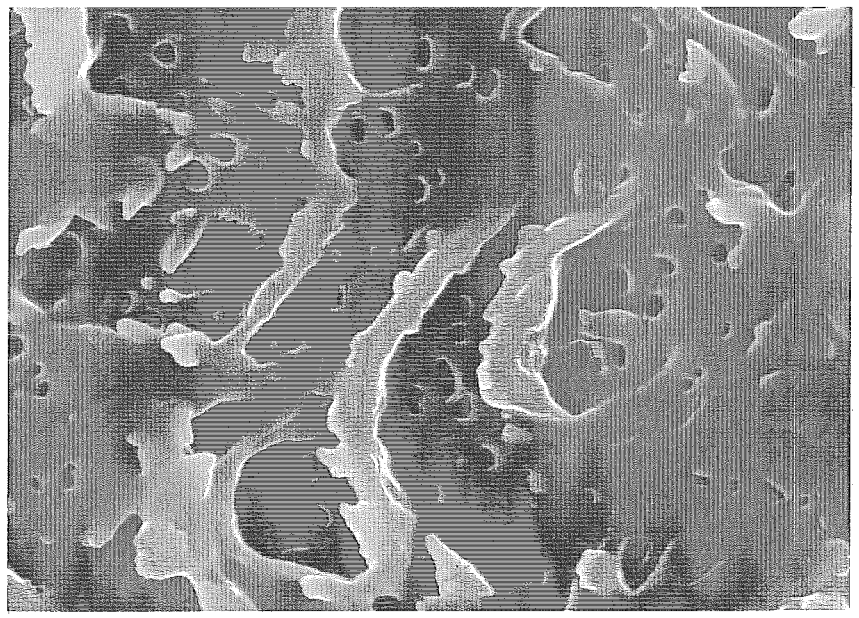
FIG. 12 shows a micrograph of foamed material of Example 5.

FIG. 11 shows a photomicrograph of the foamed material of example 5 according to the invention. It can be seen that the average pore size is much smaller than 80 μm. In addition, the electron micrograph (SEM) of the foamed material from example 5 in FIG. 12 shows that most pores, numerically, are smaller than 500 nm and so are not visible in the photomicrograph.

Figure 13:
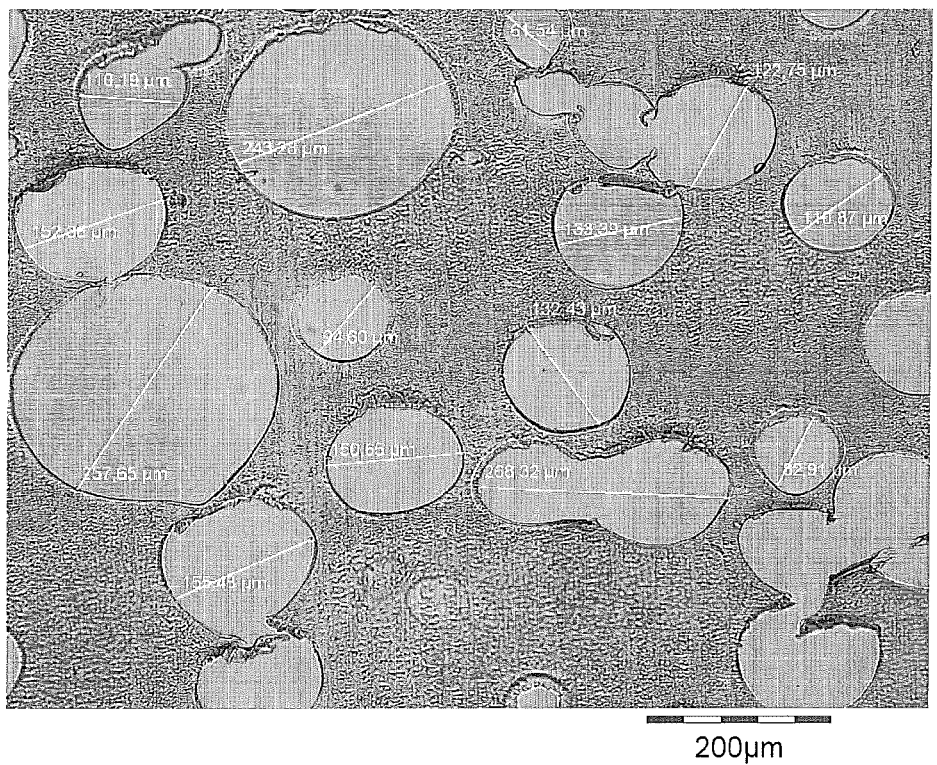
FIG. 13 shows a micrograph of foamed material of Example 7.
Figure 14:
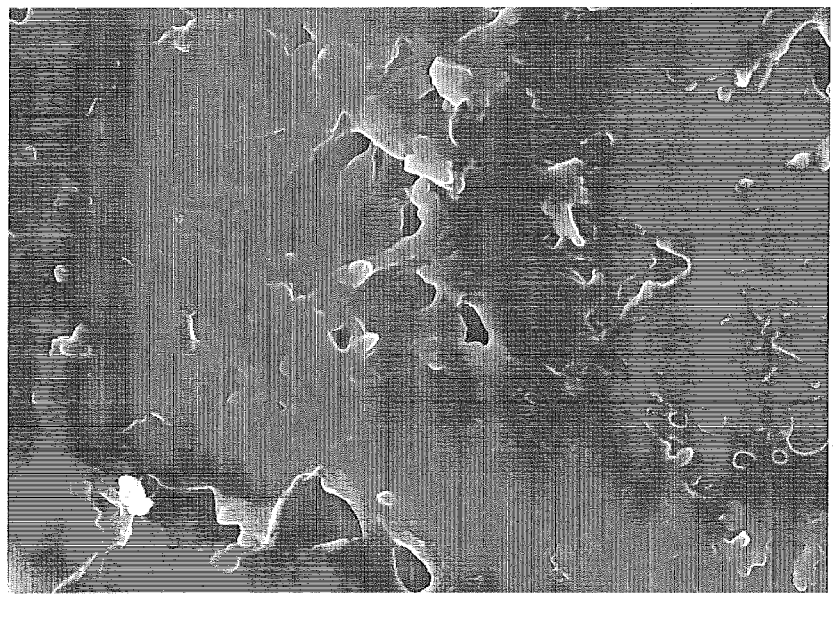
FIG. 14 shows a micrograph of foamed material of Example 7.

FIG. 13 shows a photomicrograph of the foamed material of comparative example 7. It can be seen that the average pore size is much larger than 100 μm. In addition, the electron micrograph (SEM) of the foamed material from example 7 in FIG. 14 shows that hardly any pores smaller than 500 nm have formed.

Figure 15:
FIG. 15 shows a micrograph of foamed material of Example 6.

FIG. 15 shows a photomicrograph of the foamed material of example 6 according to the invention. It can be seen that the average pore size is much smaller than 80 μm.

The results can be summarized thus:

FIG. 11 and FIG. 12 show that in example 5 the average pore size is much smaller than 1 μm. Very few bubbles form in the range 20-100 μm. By far the most pores are smaller than 500 nm.

FIGS. 13 and 14 show that in contrast to example 5, in comparative example 7 the pore size is much larger than 100 μm.

FIG. 15 shows that in example 6, with a dwell time of 38 s, a pore size of less than 80 μm is obtained.

The invention claimed is:

1. A process for producing a foamed material, comprising: providing a composition in the form of an emulsion, comprising:
   A) a matrix-forming component, wherein the matrix formed is solid at room temperature,
   B) a surfactant component, and
   C) a blowing agent component, which comprises supercritical or near-critical $CO_2$, emulsified in component A); and
   bringing the $CO_2$ of the blowing agent component C) into the subcritical state by lowering the pressure; wherein
   the blowing agent component C) further comprises a hydrophobic co-component D),
   which is soluble in supercritical $CO_2$ at a pressure of $\geq 150$ bar, is insoluble in subcritical $CO_2$ at a pressure of $\leq 40$ bar and is insoluble in component A), and
   the co-component D) is present in a proportion from $\geq 3$ wt % to $\leq 35$ wt % of the blowing agent component, and
   wherein the composition in the form of an emulsion is prepared at a pressure of $\geq 50$ bar to $\leq 200$ bar and a temperature of $\geq 20°$ C. to $\leq 80°$ C.

2. The process according to claim 1, wherein component A) comprises a compound that is reactive with polyisocyanates and a polyisocyanate.

3. The process according to claim 2, wherein the compound that is reactive with polyisocyanates is a polyol selected from the group consisting of polyether polyols, polyester polyols, polycarbonate polyols, polyetherester polyols, polyacrylate polyols and mixtures thereof, and wherein the OH number of the polyol is $\geq 100$ mg KOH/g to $\leq 800$ mg KOH/g and the average OH-functionality of the polyol is $\geq 2$.

4. The process according to claim 1, wherein component A) comprises acrylamide, epoxides and/or phenol, melamine and/or urea-formaldehyde.

5. The process according to claim 1, wherein component A) comprises polystyrene, polyvinyl chloride, polyvinyl acetate, polyethylene terephthalate, polymethyl methacrylate, thermoplastic polyurethane, polypropylene, polyethylene and/or copolymers of styrene, butadiene, acrylonitrile, methyl methacrylate, vinyl acetate and/or blends of these polymers.

6. The process according to claim 1, wherein the surfactant component B) is selected from the group consisting of alkoxylated alkanols, alkoxylated alkyl phenols, alkoxylated fatty acids, fatty acid esters, polyalkyleneamines, alkyl sulphates, alkyl polyethers, alkyl polyglucosides, phosphatidyl inositols, fluorinated surfactants, surfactants comprising polysiloxane groups, bis(2-ethyl-1-hexyl)sulphosuccinate and mixtures thereof.

7. The process according to claim 1, wherein the co-component D) is selected from the group consisting of alkanes, alkenes, aromatics, esters, ethers, ketones with $\geq 7$ to $\leq 20$ carbon atoms, linear, branched or cyclic polysiloxanes with $\geq 3$ to $\leq 20$ Si atoms and mixtures thereof.

8. The process according to claim 1, wherein bringing the $CO_2$ of the blowing agent component C) into the subcritical state takes place in a closed mould, wherein the closed mould is not part of a mixing head of a mixing unit and is arranged so that its internal volume and/or the pressure prevailing inside it after introduction of the mixture can be altered by external action.

9. The Process according to claim 1, wherein in the composition in the form of an emulsion, the components have the following proportions, wherein the total of the proportions by weight is $\leq 100$ wt %:
   A) $\geq 60$ wt % to $\leq 95$ wt % of a reactive resin mixture of MDI and/or pMDI with polyols that have an average hydroxyl number of $\geq 250$ mg KOH/g
   B) $\geq 4$ wt % to $\leq 30$ wt % of a surfactant comprising polysiloxane groups
   C) $\geq 5$ wt % to $\leq 30$ wt % of $CO_2$ and
   D) $\geq 0.3$ wt % to $\leq 10$ wt % of dodecane.

10. A composition in the form of an emulsion, suitable for producing a foamed material, comprising:
   A) a matrix-foaming component, wherein the matrix formed is solid at room temperature,
   B) a surfactant component, and
   C) a blowing agent component, which comprises supercritical or near-critical $CO_2$, emulsified in component A);
   wherein
   the blowing agent component C) further comprises a hydrophobic co-component D),
   which is soluble in supercritical $CO_2$ at a pressure of $\geq 150$ bar, is insoluble in subcritical $CO_2$ at a pressure of $\leq 40$ bar and is insoluble in component A), and furthermore the co-component D) is present in a proportion from ≥3 wt % to ≤35 wt % of the blowing agent component.

11. A foamed material, obtained by the process according to claim 1, comprising a solid matrix and gas bubbles distributed in the matrix,
wherein
on the interface between matrix and gas bubble on the side facing the interior of the gas bubble, a hydrophobic co-component D) is arranged, which is soluble in supercritical $CO_2$ at a pressure of ≥150 bar, is insoluble in subcritical $CO_2$ at a pressure of ≤40 bar and is insoluble in component A).

12. The foamed material according to claim 11, with a pore density from ≥$10^7$ pores/cm$^3$ to ≤$10^{18}$ pores/cm$^3$.

13. The foamed material according to claim 11, wherein the solid matrix comprises a polyurethane polymer.

14. The foamed material according to claim 13, wherein the material is obtained from a composition in the form of an emulsion with components in the following proportions, wherein the total of the proportions by weight is ≤100 wt %:
A) ≥60 wt % to ≤95 wt % -% of a reactive resin mixture of MDI and/or pMDI with polyols that have an average hydroxyl number of >250 mg KOH/g
B) ≥4 wt % to ≤30 wt % of a surfactant comprising polysiloxane groups
C) ≥5 wt % to ≤30 wt % of $CO_2$ and
D) ≥0.3 wt % to ≤10 wt % of dodecane.

* * * * *